J. F. O'CONNOR.
HAND BRAKE.
APPLICATION FILED OCT. 4, 1920.

1,397,230.

Patented Nov. 15, 1921.

Witnesses
Wm. Geiger

Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND-BRAKE.

1,397,230.  Specification of Letters Patent.  Patented Nov. 15, 1921.

Application filed October 4, 1920. Serial No. 414,667.

*To all whom it may concern:*

Be it known that I, JOHN F. O'CONNOR, a citizen of the United States, residing at Chicago, in the county of Cook and State of Illinois, have invented a certain new and useful Improvement in Hand-Brakes, of which the following is a full, clear, concise and exact description, reference being had to the accompanying drawings, forming a part of this specification.

This invention relates to improvements in hand brakes.

One object of the invention is to provide a hand brake of the ratcheting type especially adapted for railways cars and which is efficient in operation, economical and strong in construction, and so designed as to afford an unusually complete weather protecting housing for all of the movable parts of the ratchet mechanism proper.

More specifically, the object of the invention is in the nature of an improvement upon the general type of hand brake disclosed in Dath Patent 1,300,351, granted April 15, 1919, by which improvement certain of the parts are strengthened and a firmer bearing provided between the ratchet wheel proper and the oscillatable carrier sleeve by which the handle is carried.

Figure 1:
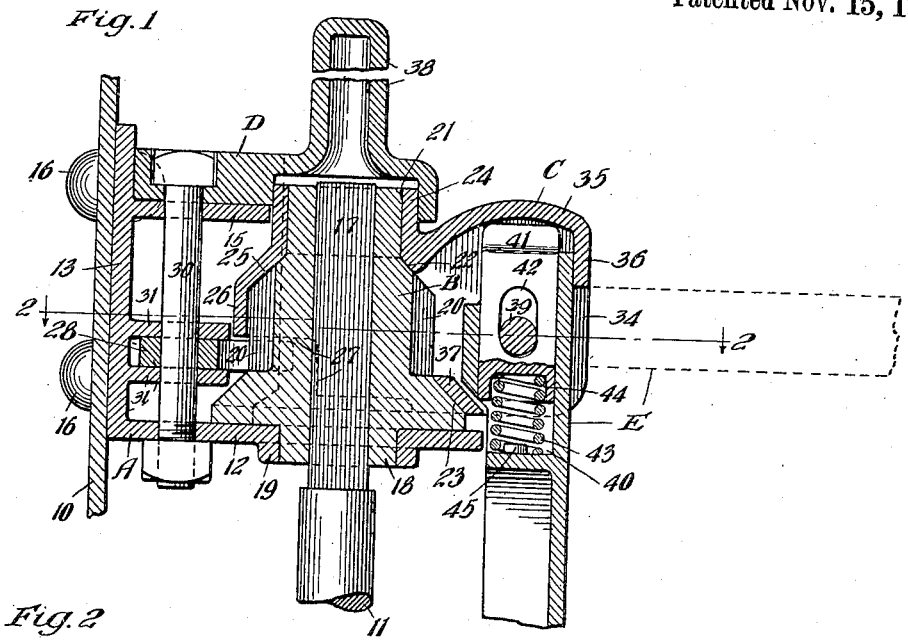
Figure 2:
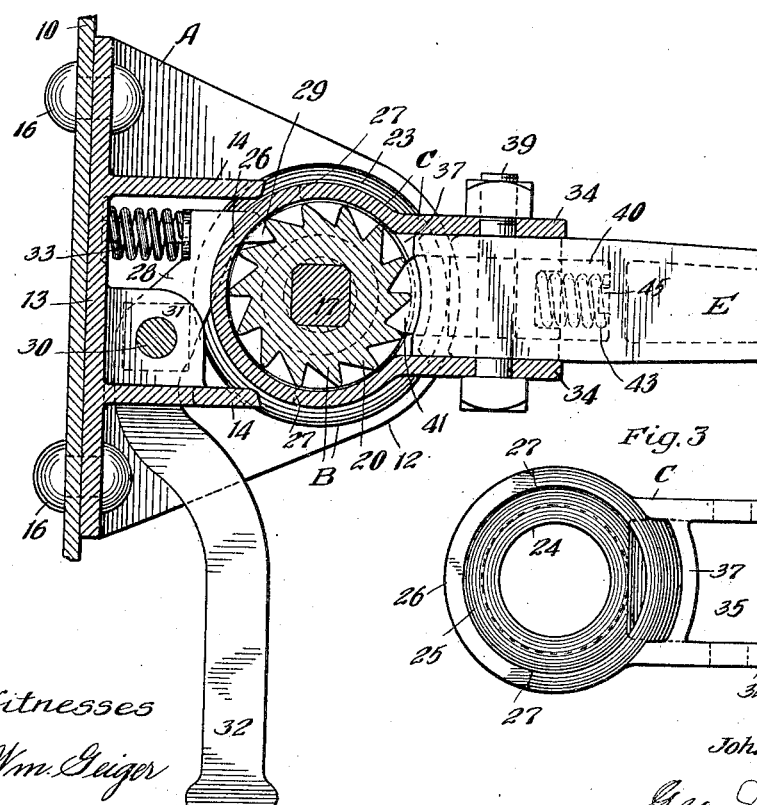
Figure 3:
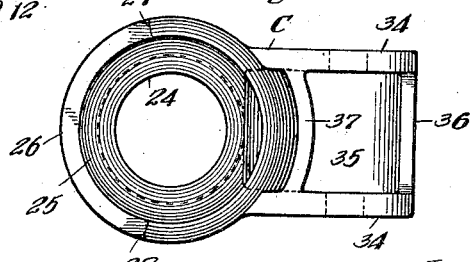

In the drawing forming a part of this specification, Figure 1 is a vertical, sectional view of a hand brake showing my improvements in connection therewith as applied to a hand brake of the vertical staff type for railway cars. Fig. 2 is a horizontal, sectional view corresponding substantially to the broken section line 2—2 of Fig. 1. And Fig. 3 is a bottom plan view of the sleeve or carrier employed in my construction.

In said drawing, 10 denotes the end wall of a box car or other car and 11 the usual vertical brake staff by which the brake chain is adapted to be tightened. Secured to the car wall 10 is a combined bearing and partial housing bracket designated generally by the reference A. Said bracket A is formed with a lower horizontal wall 12, a vertical securing wall 13, a pair of laterally extended vertical walls 14—14, and a horizontally extending flange 15. Said bracket is secured to the car wall 10 by rivets or other suitable fastening devices indicated at 16 which are passed through the vertical wall 13 as clearly shown in Fig. 2.

The upper end of the staff 11 is made of square or other non-circular cross section as indicated at 17 and has non-rotatably applied thereto a ratchet wheel or block designated generally by the reference B. Said ratchet wheel B is provided at its lower end with a bearing sleeve 18 which is rotatably mounted in a corresponding bearing 19 formed in the lower wall 12 of the bracket A. Substantially centrally thereof, the member B is provided with a ratchet wheel proper having the ratchet teeth 20—20 extending vertically as shown in Figs. 1 and 2. Above the ratchet proper 20, the ratchet wheel is formed with a top cylindrical bearing 21 which merges at its lower end with a beveled bearing surface 22. Below the ratchet section proper the wheel B is formed with another beveled or conical bearing surface 23 of larger diameter than that of the ratchet section proper, as best shown in Fig. 1.

Independently oscillatably mounted on the ratchet wheel B is a combined housing and carrier C. The latter is formed at the top thereof with a cylindrical bushing 24 which has its bearing on the cylindrical section 21 of the ratchet wheel B. Immediately below the cylindrical bushing 24, the carrier C is formed with a beveled or conical bearing surface 25 which rides upon the corresponding conical bearing surface 22 of the ratchet wheel B. Below the conical bearing section 25, the carrier C is formed with a cylindrical sleeve 26 which encircles the ratchet section proper of the ratchet wheel B, as shown in Fig. 2. Said cylindrical sleeve 26 is partially cut away on the inner side of the carrier as indicated by the dotted lines 27—27 in Figs. 1 and 2 and by the full lines 27 in Fig. 3. The parts thus cut away permit the carrier C to oscillate with respect to the pivoted locking dog 28 having the tooth 29 arranged to engage the teeth 20. Said locking dog 28 is pivotally mounted on a bolt 30 between a pair of horizontally extending vertically spaced flanges 31—31 formed integrally with the bracket A. The dog 28 has an operating handle 32 which is extended through a suitable opening in the bracket A to the exterior thereof so that it may be easily manipulated. The dog 28 is under the control of a spring 33, as shown in Fig. 2.

On the outer side, that is, the side farthest away from the car wall, the carrier C is formed with a pair of horizontally spaced laterally extended vertical flanges or arms 34—34, the same being united along their top edges by a web having a curved section 35 and a short downwardly extending flange 36, as shown in Fig. 1. At its bottom the carrier C is formed with another conical bearing section as indicated at 37 in Figs. 1 and 3, said bearing section coöperating with the corresponding conical bearing surface 23 of the ratchet wheel B. As clearly indicated in Figs. 1 and 3, said section 37 extends between and integrally unites the lower portions of the laterally extended flanges 34—34 and thereby strengthens the latter against the possibility of spreading or breaking when the operating handle is in use, as hereinafter described. Furthermore, by providing coöperating sets of bearing surfaces between the ratchet wheel and the carrier C above and below or at opposite ends of the ratchet teeth, the carrier C is firmly supported and danger of its oscillating in a vertical plane is eliminated. It will also be noted that the particular construction of carrier C above described, provides an unusually complete housing for the ratchet wheel in conjunction with the parts of the bracket A and thus danger from rain, snow, sleet, or the like obtaining access to the ratchet wheel, pawl, and dog is minimized.

The upper cylindrical bearing sleeve 24 of the carrier C is journaled in a cap plate D which is secured in place by the same bolt 30 which acts as the pivot for the dog 28. Said cap plate D is preferably provided with an upstanding hollowed hand grip 38 for the convenience of the brakeman in obtaining a secure hold with one hand, while operating the brake with the other hand.

The operating handle or lever is indicated at E and is pivotally mounted between the flanges 34 on the carrier C by means of the horizontally extending bolt or pivot pin 39. At its pivot end, the handle E is formed with a longitudinally extending socket 40 in which is reciprocatingly mounted a double-toothed pawl 41. The latter is formed with an elongated slot 42 through which the pivot bolt 39 is extended, it being obvious that the latter limits the outward movement of the pawl with respect to the handle and consequently prevents disassembling of the pawl. The pawl 41 is preferably spring influenced as by means of the coil spring 43, which has one end seated in a suitable socket 44 carried by the pawl and the other end seated over a stud 45 formed on a transversely extending web of the handle E.

In Fig. 1 the full line showing of the handle E and pawl 41 corresponds to the inoperative position of the parts, that is, when the handle hangs vertically downward under the influence of gravity. To operate the brake the brakeman elevates the handle to the dotted line position shown in Fig. 1 which obviously brings the pawl 41 into operative relation with the ratchet section proper of the ratchet wheel B. Oscillation of the handle E back and forth in a horizontal plane manifestly will advance or rotate the staff 11 step by step and the ratchet wheel and staff will be held against accidental reverse rotation by the locking dog 28. Upon release of the handle E, the latter will automatically fall to its inoperative position under the influence of gravity so that, when the brake is released by pulling on the locking dog handle 32, there is no danger of the brakeman being injured by the operating handle being suddenly swung around.

I have herein shown and described what I now consider the preferred manner of carrying out my invention, but the same is merely illustrative and I contemplate all such changes and modifications as come within the scope of the claims appended hereto.

I claim:

1. In a brake, the combination with a member adapted to be rotated in one direction to effect tightening of a brake chain; of a combined bearing and partial housing bracket adapted to be secured to a wall of a car or the like; a ratchet wheel secured to said member, said ratchet wheel and member being rotatably mounted with respect to said bracket, said ratchet wheel having bearing surfaces at each end of the ratchet section proper thereof; a combined housing and carrier independently oscillatably mounted on said ratchet wheel and having correspondingly spaced bearing surfaces engageable with said bearing surfaces of the ratchet wheel; an operating handle carried by said sleeve; a pawl associated with said handle and adapted to coöperate with the ratchet wheel; and means for locking said ratchet wheel and member against accidental reverse rotation.

2. In a brake, the combination with a vertical brake staff; of a combined bearing and partial housing bracket adapted to be secured to a vertical wall of a car; a ratchet wheel rigidly mounted on said staff, said ratchet wheel and staff being rotatably mounted with respect to said brake and the ratchet wheel being provided with conical bearing surfaces above and below the ratchet section proper; a combined housing and carrier independently oscillatably mounted on said ratchet wheel and having also upper and lower correspondingly located conical bearing surfaces coöperable with those of said ratchet wheel; an operating handle carried by said sleeve and mounted to fall, under the influence of gravity, to an inoperative position; a pawl associated with said handle and coöperable with the ratchet wheel when the handle is in an elevated operative position; and means for locking said ratchet wheel and staff against accidental reverse rotation.

3. In a hand brake for railway cars, the combination with a combined bearing and housing bracket adapted to be secured to a vertical wall of the car; of a ratchet wheel mounted on said housing and adapted to be non-rotatably united with a vertical brake staff; said ratchet wheel having a ratchet section proper and bearing surfaces thereon; a locking dog mounted on said bracket, adapted to coöperate with said ratchet section and having a release handle; a carrier independently oscillatably mounted on said ratchet wheel, said carrier having bearing surfaces coöperable with those of the ratchet wheel and a pair of spaced laterally extended flanges, said flanges being united at the top by an integral web, said flanges being also integrally united at the bottom portions thereof by a strengthening connecting web; and an operating handle pivotally mounted between said flanges of the carrier, said handle having mounted therein a spring controlled pawl, said handle being adapted to fall to an inoperative vertical position under the influence of gravity.

In witness that I claim the foregoing I have hereunto subscribed my name this 28th day of Sept., 1920.

JOHN F. O'CONNOR.

Witness:
CARRIE GAILING.